United States Patent [19]
Ray et al.

[11] Patent Number: 6,035,394
[45] Date of Patent: Mar. 7, 2000

[54] SYSTEM FOR PROVIDING HIGH PERFORMANCE SPECULATIVE PROCESSING OF COMPLEX LOAD/STORE INSTRUCTIONS BY GENERATING PRIMITIVE INSTRUCTIONS IN THE LOAD/STORE UNIT AND SEQUENCER IN PARALLEL

[75] Inventors: David Scott Ray, Georgetown; Kevin Arthur Chiarot, Pflugerville; David Andrew Schroter, Round Rock; A. James Van Norstrand, Jr., Round Rock; Barry Duane Williamson, Round Rock, all of Tex.

[73] Assignee: International Business Machines Corporation, Armonk, N.Y.

[21] Appl. No.: 09/024,805

[22] Filed: Feb. 17, 1998

[51] Int. Cl.[7] ...................................................... G06F 9/38
[52] U.S. Cl. ......................... 712/245; 712/245; 712/246; 712/247
[58] Field of Search ...................................... 711/118, 123, 711/125, 126, 140, 811; 712/200, 811; 710/5

[56] References Cited

U.S. PATENT DOCUMENTS

| | | | |
|---|---|---|---|
| 5,291,586 | 3/1994 | Jen | 712/220 |
| 5,416,911 | 5/1995 | Dinkjian | 712/225 |
| 5,664,215 | 9/1997 | Burgess | 712/23 |
| 5,826,084 | 10/1998 | Brooks | 709/107 |

*Primary Examiner*—Meng-Ai T. An
*Assistant Examiner*—Stacy Whitmore
*Attorney, Agent, or Firm*—Anthony V.S. England

[57] ABSTRACT

One aspect of the invention relates to a method for operating a superscalar processor having an instruction cache, a sequencing unit, a load/store unit, a cache, an architectural register file and a rename register file. In one particular version of the invention, the method includes the steps of forwarding an instruction from the instruction cache to the sequencing unit operable to access multiple architectural registers; generating a plurality of primitive instructions responsive to the forwarded instruction in which an individual primitive instruction is operable to access an individual architectural register; and sequentially issuing the primitive instructions to move data between the data cache and the rename register file.

20 Claims, 6 Drawing Sheets

| | RENAME ENTRY | COMPLETION TABLE IID | OP | REG | ADDR |
|---|---|---|---|---|---|
| PRIMITIVE | 0 | 0 | LD | R15 | A |
| | 1 | 1 | LD | R16 | A+4 |
| | 2 | 2 | LD | R17 | A+8 |
| | ⋮ | ⋮ | ⋮ | ⋮ | ⋮ |
| | 16 | 16 | LD | R31 | A+64 |
FIG. 3
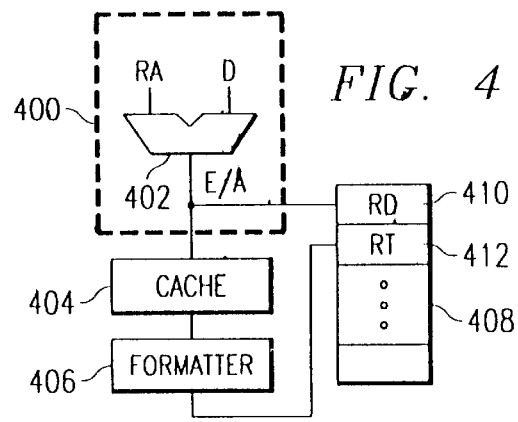
FIG. 4
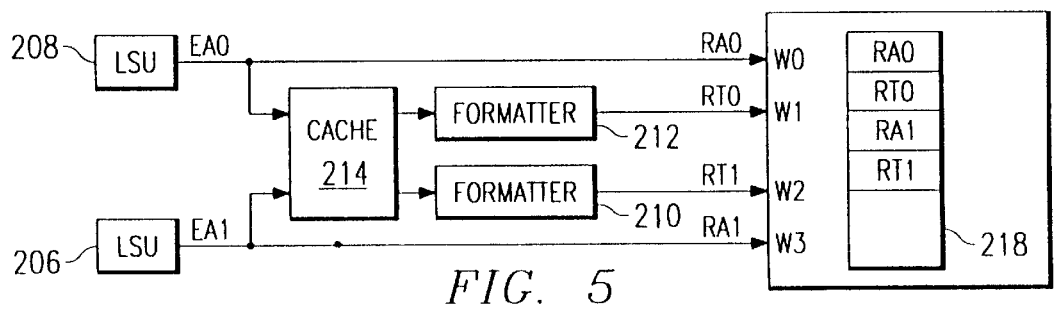
FIG. 5
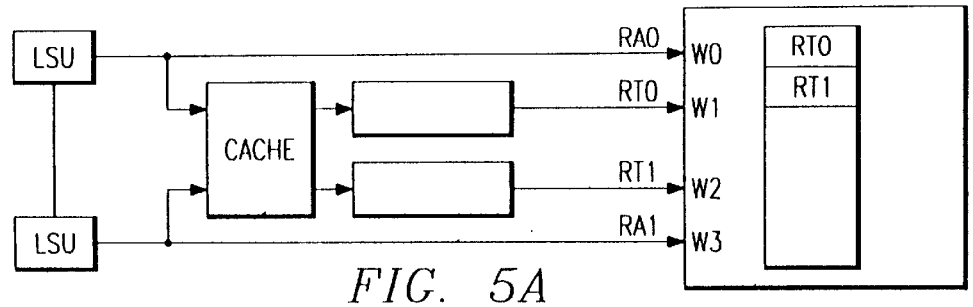
FIG. 5A REORDER Buffer:

| iid# | Operation | # writebacks | Finished? | Exceptions | PsuedoOp? |
|---|---|---|---|---|---|
| 0 | ldu | 2 | 0 | 0 | no |

*FIG. 5B*

Register Renaming

R15 renamed to RR0 (Register Rename 0) (next available rename target)
R1 renamed to RR1 (Register Rename 1) (next available rename target)

| Entry | Architected Register |
|---|---|
| 0 | 15 |
| 1 | 1 |

*FIG. 5C*

REORDER Buffer:

| iid# | Operation | # writebacks | Finished? | Exceptions |
|---|---|---|---|---|
| 0 | ldu | 2 (ldu) | Yes | none |

*FIG. 5D*

REORDER Buffer:

| iid# | Operation | # writebacks | Finished? | Exceptions | PsuedoLdu? | Cycle |
|---|---|---|---|---|---|---|
| 0 | lmw | 1 | 0 | 0 | yes | 1st |
| 1 | lmw | 2 (ldu) | 0 | 0 | yes | 2nd |
| 2 | lmw | 2 (ldu) | 0 | 0 | yes | 3rd |

*FIG. 5E*

Register Renaming

| | | | Cycle |
|---|---|---|---|
| R27 renamed to RR0 | (Register Rename 0) | (next available rename target) | 1st |
| R28 renamed to RR1 | (Register Rename 1) | (next available rename target) | 2nd |
| R29 renamed to RR2 | (Register Rename 2) | (next available rename target) | 2nd |
| R30 renamed to RR3 | (Register Rename 3) | (next available rename target) | 3rd |
| R31 renamed to RR4 | (Register Rename 4) | (next available rename target) | 3rd |

| Entry | Architected Register | Cycle |
|---|---|---|
| 0 | 27 | 1st |
| 1 | 28 | 2nd |
| 2 | 29 | 2nd |
| 3 | 30 | 3rd |
| 4 | 31 | 3rd |

*FIG. 5F*

| LSU0 cle | | | | LSU1 | | | | Cy |
|---|---|---|---|---|---|---|---|---|
| EA0 | Rename Tag | IID | m_fin | EA1 | Rename Tag | IID | m_fin | |
| R1+D st | RR0 | 0 | y | - | - | - | - | 1 |
| R1+D+4 nd | RR1 | 1 | n | R1+D+8 | rr2 | 1 | y | 2 |
| R1+D+12 rd | RR3 | 2 | n | R1+D+16 | rr3 | 2 | y | 3 |

FIG. 5G

| LSU0 cle | | | | LSU1 | | | | Cy |
|---|---|---|---|---|---|---|---|---|
| Formatter: Data Addressed by: | Rename Tag | IID | m_fin | Formatter: Data Addressed by: | Rename Tag | IID | m_fin | |
| R1+D st | RR0 | 0 | y | - | - | - | - | 1 |
| R1+D+4 nd | RR1 | 1 | n | R1+D+8 | rr2 | 1 | y | 2 |
| R1+D+12 rd | RR3 | 2 | n | R1+D+16 | rr3 | 2 | y | 3 |

FIG. 5H

| REORDER Buffer: | | | | | | Cycle |
|---|---|---|---|---|---|---|
| iid# | Operation | # writebacks | Finished? | Exceptions | PsuedoLdu? | |
| 0 | lmw | 1 | Y | 0 | yes | 1st |
| 1 | lmw | 2 (ldu) | Y | no | yes | |
| 2 | lmw | 2 (ldu) | Y | 0 | yes | 3rd |

FIG. 5I

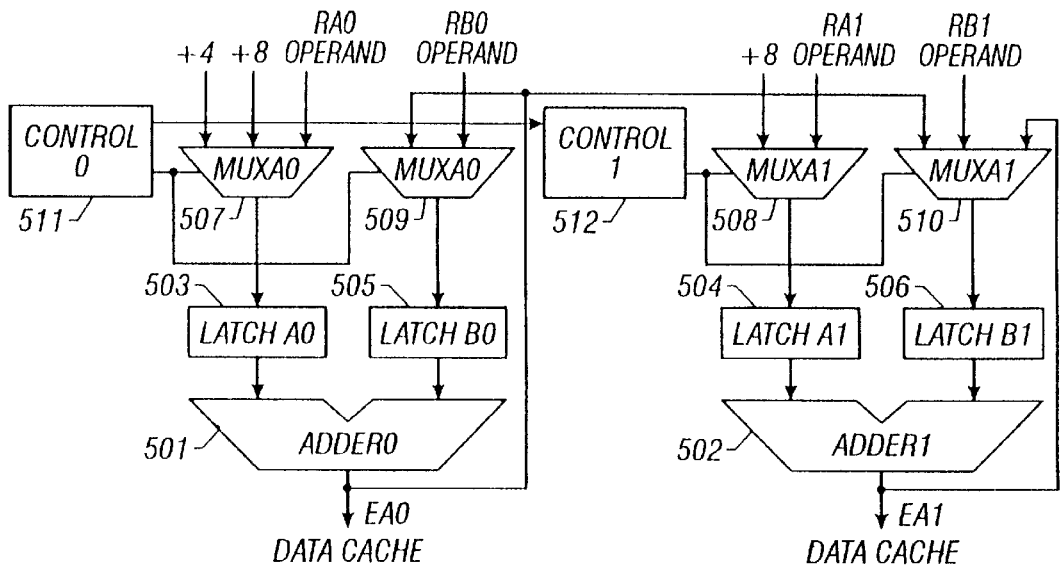
FIG. 6
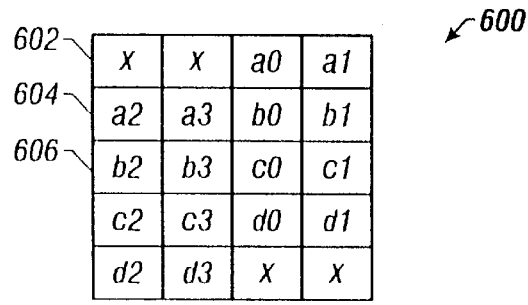
FIG. 6A
|  | OP code | TARGET RENAME REGISTER | DATA CACHE ADDRESS | IID |
|---|---|---|---|---|
| Cycle 0 | LDU1<br>LDU2 | RT<br>RT | EA<br>EA+4 | 0<br>0 |
| Cycle 1 | LDU1<br>LDU2 | RT+1<br>RT+2 | EA+8<br>EA+12 | 1<br>1 |
| Cycle 2 | LDU1<br>LDU2 | RT+3<br>RT+4 | EA+16<br>EA+20 | 1<br>1 |
FIG. 6B

REORDER Buffer:

| iid# | Operation | # writebacks | Finished? | Exceptions | PsuedoOp? |
|---|---|---|---|---|---|
| 0 | stwd | 0 | 0 | 0 | no |

Register Renaming

Rename is interrogated and R15 is found to be assigned to rename target register 0

| Entry | Architected Register |
|---|---|
| 0 | 15 |

REORDER Buffer:

| iid# | Operation | # writebacks | Finished? | Exceptions |
|---|---|---|---|---|
| 0 | stwd | 0 | Yes | none |

SYSTEM FOR PROVIDING HIGH PERFORMANCE SPECULATIVE PROCESSING OF COMPLEX LOAD/STORE INSTRUCTIONS BY GENERATING PRIMITIVE INSTRUCTIONS IN THE LOAD/ STORE UNIT AND SEQUENCER IN PARALLEL

FIELD OF THE INVENTION

This invention relates generally to the field of computer processors, and more particularly, to processors which are integrated on a single microprocessor chip. Still more particularly, the invention relates to speculatively processing string/multiple operations which move data between a data cache and a register file.

BACKGROUND OF THE INVENTION

Providing ever faster microprocessors is one of the major goals of current processor design. Many different techniques have been employed to improve processor performance. One technique which greatly improves processor performance is the use of cache memory. As used herein, cache memory refers to a set of memory locations which are formed on the microprocessor itself, and consequently, has a much faster access time than other types of memory, such as RAM or magnetic disk, which are located separately from the microprocessor chip. By storing a copy of frequently used data in the cache, the processor is able to access the cache when it needs this data, rather than having to go "off chip" to obtain the information, greatly enhancing the processor's performance.

Superscalar processors achieve still further performance advantages over conventional scalar processors because they allow instructions to execute out of program order. In this way, one slow executing instruction will not hold up subsequent instructions which could execute using other resources on the processor while the stalled instruction is pending.

However, certain problems arise when superscalar processors attempt to take full advantage of cache memory. One problem arises in the processing of certain complex types of load and store instructions. Numerous techniques exist for processing simple load or store instructions which have a one-to-one correspondence between the instruction and the transfer from the data cache to the architected registers, or vice versa. One example of a simple cache accessing instruction is a load instruction which loads data from a location in cache memory into a single rename register, where the width of the register in the rename file is the same as the data transferred from the cache. Thus, there is one load instruction for each load into the register file. However, it becomes much more difficult to implement a data processor which allows a complex load instruction, such as a load multiple or a load string, to load data from the data cache into a series of rename or architectural registers. This is because the one-to-one correspondence between the instruction and the physical transfer of data no longer exists, and it is much more difficult to track the instruction's progress through the processor and ensure that it is satisfactorily completed.

One technique for processing complex load or store instructions in a superscalar processor is to halt further dispatch of instructions as soon as the dispatch of a complex load or store instruction is detected by the dispatch unit. This is described in U.S. Pat. No. 5,664,215 to Burgess, incorporated herein by reference. In this technique, all pending instructions in the processor are then allowed to complete. Afterwards, the complex load or store instruction is then dispatched and executed by the processor in scalar fashion. When the complex instruction is complete, then the processor resumes dispatch of instructions. Although this ensures that the complex load or store instruction will be accurately completed, it does so at the expense of processor performance. Accordingly, it is one object of the invention to provide a data processor which provides high performance speculative processing of complex load and store operations. Still further objects and advantages of the present invention will become apparent in view of the following disclosure.

SUMMARY OF THE INVENTION

One aspect of the invention relates to a method for operating a superscalar processor having an instruction cache, a sequencing unit, a load/store unit, a data cache, an architectural register file and a rename register file. In one embodiment, the method comprises the steps of forwarding an instruction from the instruction cache to the sequencing unit, the instruction being operable to target multiple architectural registers; generating a plurality of primitive instructions responsive to the forwarded instruction in which an individual primitive instruction is operable to access an individual architectural register, and sequentially issuing the primitive instructions to move data between the data cache and the rename register file.

Another aspect of the invention relates to a circuit for processing cache access instructions in a superscalar processor having an instruction cache, a sequencing unit, a load/store unit, a data cache, an architectural register file and a rename register file. In one embodiment, the circuit comprises a means for forwarding an instruction from the instruction cache to the sequencing unit, the instruction being operable to target multiple architectural registers; a means for generating a plurality of primitive instructions responsive to the forwarded instruction in which a individual primitive instruction is operable to access an individual architectural register; and a means for sequentially issuing the primitive instructions to move data between the data cache and the rename register file.

Still a further aspect of the invention relates to a method for processing cache access instructions in a superscalar processor having an instruction cache, a sequencing unit, at least one load/store unit, a data cache, an architectural register file, a rename register file, and a completion unit. In one embodiment, the method comprises the steps of forwarding a cache accessing instruction from the instruction cache to the sequencing unit; forwarding the cache accessing instruction to the load/store unit; and generating a plurality of primitive instructions in parallel in the sequencing unit and the load/store unit.

BRIEF DESCRIPTION OF THE DRAWINGS

FIG. 3 is a table illustrating the generation of primitive load instructions according to an embodiment of the invention.

FIG. 4 is a schematic diagram of a conventional circuit for processing load with update instructions.

FIG. 5 is a schematic diagram of a circuit according to an embodiment of the invention.

FIG. 5A is a data flow diagram of the schematic diagram shown in FIG. 5.

FIG. 5B depicts a reorder buffer which has been updated with an entry of an LDU instruction according to an embodiment of the invention.

FIG. 5C is a table depicting formation of the rename register according to an embodiment of the invention.

FIG. 5D depicts the contents of the reorder buffer having an entry written therein according to the embodiment of the invention.

FIG. 5E depicts the contents of the reorder buffer after execution of a load multiple instruction according to an embodiment of the invention.

FIG. 5F depicts the operation of the rename register according to an embodiment of the invention.

FIGS. 5G and 5H depict the operation of the string stall counter according to an embodiment of the invention.

FIG. 5I depicts the operation of the reorder buffer according to an embodiment of the invention.

FIG. 6 is a schematic diagram illustrating a load/store unit according to an embodiment of the invention.

FIG. 6A is a table illustrating misaligned data in a data cache.

FIG. 6B is a table illustrating the processing of misaligned load instructions according to an embodiment of the invention.

DETAILED DESCRIPTION OF EMBODIMENTS OF THE INVENTION

Figure 1:
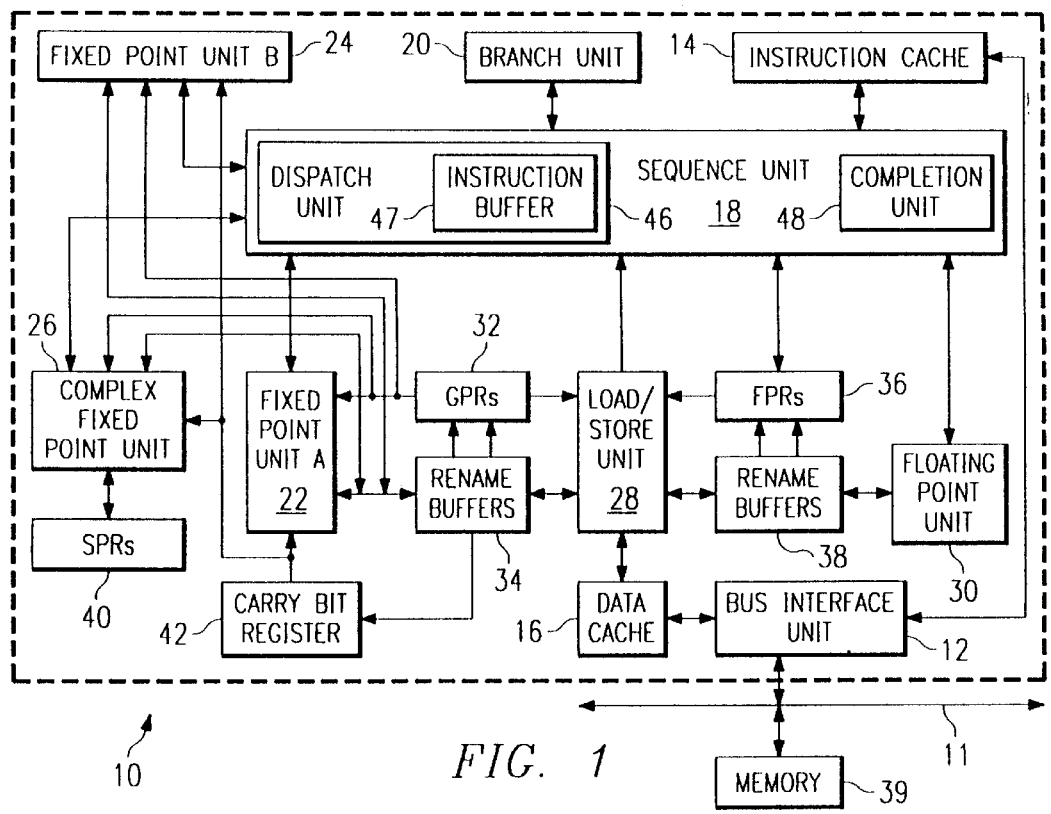
FIG. 1 is a block diagram of a data processor useful in embodiments of the invention.

FIG. 1 is a block diagram of a processor system 10 for processing information in accordance with the present invention. In the preferred embodiment, processor 10 is a single integrated circuit superscalar microprocessor, such as the PowerPC™ processor from IBM Corporation, Austin, Tex. Accordingly, as discussed further hereinbelow, processor 10 includes various units, registers, buffers, memories, and other sections, all of which are formed by integrated circuitry. Also, in the preferred embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and a fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches through a dispatch unit 46 the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, Oring and XORing. CFXU 26 executes a second class of fixed point operations on source operands, such as fixed point multiplication and division. FPU 30 executes floating point operations on source operands, such as floating point multiplication and division.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "pipelining". In a significant aspect of the preferred embodiment, an instruction is normally processed at six stages, namely fetch, decode/dispatch, execute, finish, completion and writeback.

In the preferred embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16 or memory.

As an example of the interaction among the execution units, e.g., FXUA 22, FXUB 24, rename buffers 34, and the dispatch unit 46, an instruction "add c,a,b" is dispatched from the dispatch unit 46 to the FXUA 22. The dispatch unit 46 provides the FXUA 22 with tags for the operands "a" and "b" to tell the FXUA 22 where to retrieve the data for the operands, as is well understood by those skilled in the art. For example, in a system with six rename buffers, the dispatch unit 46 might suitably tag the operand for "a" as being located in a rename buffer 1 with a six bit tag 100000. A tag of 010000 might then suitably be used to indicate that the operand "b" is in the rename buffer 2. Since the FXUA 22 does not write into GPRs 32, the dispatch unit 46 must use a rename buffer tag for the target of the operation, such as 001000, for the result of the "add" instruction to be placed in rename buffer 3.

Figure 2:
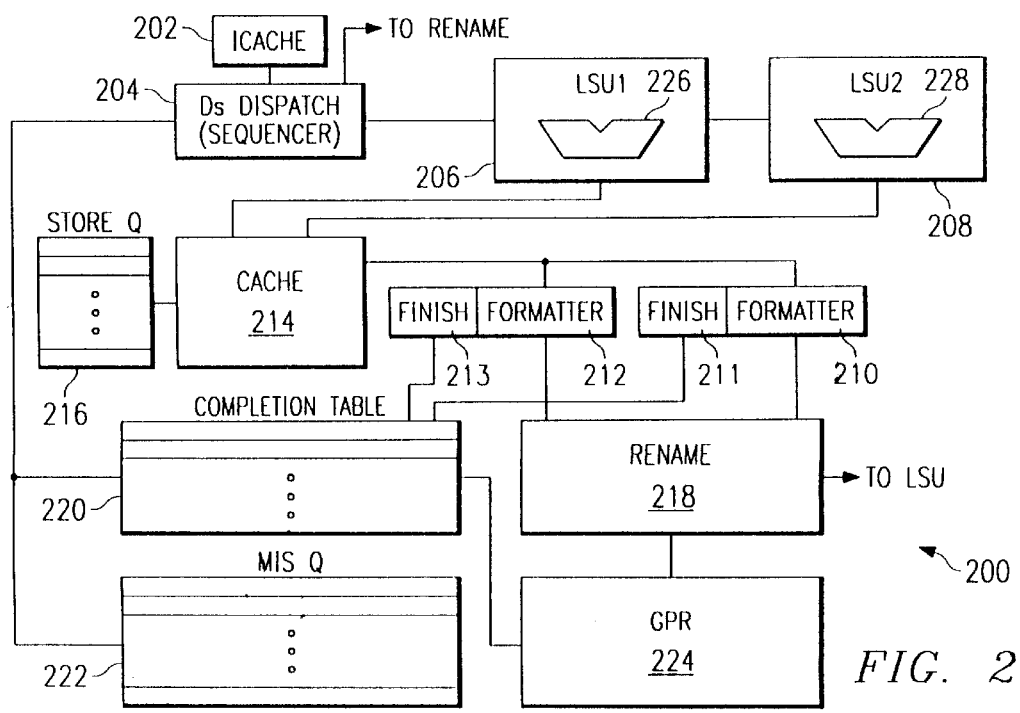
FIG. 2 is a block diagram of a circuit for processing instructions according to an embodiment of the invention.

Referring now to FIG. 2, there is a block diagram of a circuit 200 for processing string/multiple instructions according to an embodiment of the invention. In this case, the circuit 200 comprises an instruction cache 202 which forwards instructions to the dispatch unit, or sequencer, 204. The sequencer 204 decodes the instructions from the instruction cache and passes the decoded instruction data to the load/store units 206 and 208. At the same time, sequencer 204 creates entries in the completion table 220 and the rename register file 218 to hold the data generated during the processing of the instruction. As will be described in greater detail herein, the circuit 200 is advantageously used with complex forms of load and store instructions including multiple word load/store instructions and string load/store instructions. Such complex load/store instructions are supported in various architectures, such as, the exemplary POWER PC architecture, available from IBM Corporation. The POWER PC architecture is fully described in various publications, such as the *Power PC Microprocessor Family: the Programming Environment,* available from IBM Microelectronics as Publication No. MPRPPCFPE-01, incorporated herein by reference.

For example, according to the POWER PC architecture, a load multiple word instruction loads the contents of n consecutive words (32-bits per word) from the data cache 214 into n consecutive registers of GPR file 224, where n is an integer equal to 32 minus the number of the beginning target register ("RT") targeted by the instruction. By convention, the 32 registers of GPR file 224 are numbered 0 through 31. Each register of the GPR file 224 is 4-bytes or one word wide. The notational format for a load multiple instruction is given by: LM, RT, RA+D, where LM is the op code and the data read by the load multiple instruction begins at the memory address specified by the sum of the register RA (operand A) and the field D (operand B). The data is loaded into the sequence of registers beginning with the register specified by RT.

A store multiple word instruction is described by the notation: STM RS, RA+D. An STM instruction stores the contents of n consecutive registers of GPR file 224 into the contents of n consecutive words in the data cache 214, where n is an integer equal to (32−RS). The store multiple instruction begins at the memory address specified by the sum of register RA (operand A) and the field D (operand B). The data is stored into the sequence of cache memory locations addressed by (RA+0) beginning with the location specified by RS in the GPR.

A load string word immediate instruction loads the contents of NB consecutive memory bytes into consecutive registers of GPR file 224. The load string word immediate instruction begins at the memory byte address specified by the contents of register RA and at the register specified by RT.

A store string word immediate instruction stores the contents of consecutive registers of GPR file 224 into the contents of the cache memory. The store string word immediate instruction begins at the memory address specified by the contents of register RA.

A load string word index instruction loads the contents of M consecutive memory bytes into (M/4 rounded up to next integer) consecutive registers of GPR file 224. M is a field in a special purpose register (not shown). The load string indexed instruction begins at the memory byte address specified by the sum of the contents of register RA and register RB and the register specified by RT. Otherwise, the load string word indexed instruction is similar to the load string immediate instruction.

A store string word index instruction stores the contents of (M/4, rounded up to the next integer) consecutive registers of GPR file 224 into the contents of M consecutive memory bytes. M is a field in a special purpose register. The store string word index instruction begins at the memory address specified by the sum of the contents of register RA and RB and at the register specified by RS. Otherwise, the store string word indexed instruction is similar to the store string immediate instruction. Of course, the circuit 200 is also useful with other types of instructions, and variations in architecture as will be clear to those of skill in the art in view of the following disclosure.

After the sequencer 204 receives a complex load or store instruction as described above, it "unrolls" the instruction during the instruction's dispatch stage to create a sequence of "primitive" load or store instructions. A primitive load instruction is an instruction which accesses a single word in cache 214 and writes it into a register in GPR 224, and vice-versa in the case of a primitive store instruction.

The unrolling of instructions will be described in greater detail with respect to FIG. 3. FIG. 3 is a table illustrating the unrolling of load multiple instruction LM R15, RA+D, where LM is a load multiple instruction, R15 is the target register for the beginning word point in the GPR register file 224 and RA+D are operands which contain the effective address of the location in cache memory 214 from which the load multiple instruction will begin accessing. It will be clear to those of skill in the art that this instruction will load 17 registers, i.e., registers 15–31 of the GPR register file 224. Thus, it will be unrolled into 17 primitive load instructions by the sequencer 204.

As shown in FIG. 3, each of the primitive instructions is assigned an instruction identification tag ("IID") by the sequencer 204. Of course, as in conventional superscalar processors, the data from the cache is not loaded directly into the GPR file, but rather is loaded into a rename register file 218 until the instruction completes without exception. Afterwards, a writeback signal is sent from the completion table 220 to the GPR file control logic which causes the data for the instruction to be written from the rename register file 218 into the GPR register file. Thus, as sequencer 204 generates each of the primitive load instructions shown in FIG. 3, it signals the rename register file 218 to create space to receive the data from the corresponding primitive load instruction. Rename register file 218 then reports back to the LSU units 206 and 208, the rename register assigned for that particular primitive load instruction. In this case, it will be assumed that rename register file 218 assigns rename entry 0 to contain the data from the primitive load instruction targeting GPR register 15. Also, for sake of convenience, it will be assumed that a completion IID of 0 assigned to the load instruction by the sequencer 204 at the same time. Thus, rename register file 218 reports back the rename register entry of 0 to the LSU 206 and 208, and this entry is tracked through the processor 200 as will be described in greater detail herein.

Also, during the dispatch cycle, sequencer 204 creates entries in the completion table 220 for the primitive load instruction. It will be understood that each of the primitive load instructions must be completed in-order according to the present invention. Each entry in the completion table 220 contains a number of data fields. One data field contains the IID for the instruction which created the entry. Another field contains the writeback vector which is passed to the control logic for GPR file 224 upon completion of the instruction. This informs the GPR file 224 of the register in the rename file 218 to access during writeback. Another field in each completion table entry is the exception field. If an instruction generates an exception during execution, then at completion, the processor detects the exception bits to determine how to handle whatever problem arose during execution of the instruction. Also, each entry in the completion table contains a finish field which is used to mark the instruction as finished after the data has been written from the cache to the formatter as will be described in greater detail herein.

Although it would be possible for the sequencer 204 to dispatch the primitive instructions to LSU 206 and 208, the present invention advantageously uses LSU 206 to simultaneously unroll the load multiple instruction into a sequence of primitive loads in parallel with the sequencer 204. This is because it enables LSU 206 to operate in tandem with LSU 208 to issue two instructions per machine cycle as will be described in greater detail.

LSU 206 is provided with adder 226 to calculate the effective address into the data cache 214 required by the primitive load instruction. More specifically, since each word in the cache is 32-bits wide, it is seen that each sequential access to cache memory 214 is 4 bytes from the previous effective address of the last instruction. In other words, referring again to FIG. 3, in cycle 0, the first address into cache memory 214 is at memory location A. The next primitive load instruction (IID=1) will access the location in cache memory 214 at A+4. The third primitive load instruction (IID=2) will access cache memory 214 at the address A+8, and so on. Similarly, the target register for each of the primitive load instructions is incremented by one from the preceding primitive load instruction.

As stated previously, LSU 206 is provided with adder 226 which generates the effective address .LSU 206 forwards, or issues, the effective address, along with the target rename register provided by rename register file 218 to the data cache 214. At the same time, an entry is created into the mis-queue table 222 to store information required to process the primitive load instruction. Each entry in the mis-queue table 222 contains a number of fields. One field contains the IID associated with the primitive instruction. Other fields contain the rename register for the instruction, the effective address and real addresses of the instruction, various tag bits which are used in the case of misaligned accesses to the cache, a bit which indicates whether the operation is a string operation and a "last" bit which indicates whether the particular primitive load instruction is the last load instruction to complete a load multiple or load string operation. All instructions pass through the mis-queue. If an instruction hits in the cache, then the entry in the mis-queue table will exist only for two cycles. However, if the entry misses in the cache, then the entry will remain in the mis-queue table until data is returned from off-chip memory for the instruction and written to the rename register file 218.

On issue, the LSU 206 sends the effective address and target rename to cache 214. Cache 214 then forwards the data for the instruction to the formatter 212 for reassembly of the data, if required. Suitable formatters are well known in the art and will not be described in detail herein except as necessary to illustrate operation of embodiments of the invention.

After the data is received and processed by formatter 212, it is forwarded to the correct entry in the rename register file 218. At the same time, finish logic 213 associated with the formatter 212, sends a signal to the completion table containing the IID for the finishing instruction, along with any exception bits that may have occurred while the instruction was processing. This causes the finish bit for the instruction to be set in its entry in the completion table 220. The instruction will be ready to complete when all previous instructions issued before it have finished without exception. When the instruction is ready to complete, the completion table 220 sends a writeback signal to the GPR 224 which accesses the entry in the rename register file 218 and stores it into targeted GPR entry, thus changing the state of the machine.

String and last tag bits are sent to the data cache memory control unit (DCMMU) from the load/store unit. The load/store unit submits the effective address to the DCMMU in program order. The DCMMU control logic uses the string bits to determine whether adjacent entries in its mis-queue are from an instruction that is string operation or multiple operation. When this occurs, the DCMMU control unit must force data returning through the formatters to return in order. The "last" bit is used to mark the end of a string or multiple transfer. This allows the DCMMU to determine the ends of a transfer of string and/or multiple requests.

Returning data in program order prevents corruption of the merge latches if the request is misaligned. It also prevents early finishing of a "pseudo" instruction which requires two requests for the same IID.

According to another embodiment of the invention, the circuit 200 achieves still higher performance by finishing two primitive load instructions per cycle. In one embodiment, this is achieved by use of a second LSU 208 which is used simultaneously with LSU 206. This embodiment of the invention will be described with respect to the exemplary POWERPC architecture. The POWER PC architecture supports an instruction format referred to as a load with update ("LDU") instruction. The load with update instruction differs from the primitive load instructions described above in that it has two target GPR locations. More specifically, the form of a LDU instruction is as follows:

LDU RT (RA)+D where RT is the target GPR register and RA is a source GPR register which is used to calculate the effective address of the load instruction. However, in addition to routing the data from the address into RT, the LDU instruction also writes the calculated effective address, i.e., RA+D back into the source GPR location which provided RA. Thus, by using an LDU instruction, it is seen that, on finish, two words of data are written from the formatter 212 or 210 into the rename register file 218. However, the circuit 200 must be modified to allow an LDU instruction to write two words to rename register 218 from cache memory 214. This will be described in greater detail with respect to FIG. 4.

FIG. 4 is the block diagram illustrating a portion of a load/store unit 400 connected to a cache 404, a formatter 406 and a rename register file 408. When the load/storeunit executes a LDU instruction, the effective address is calculated by adding the operand RA retrieved from a GPR register and operand D by adder 402. This effective address is sent to cache 404 which forwards the information through formatter 406 and into the target register RT 412 and rename register file 408. At the same time, the effective address is also forwarded from adder 402 into register RD 410 in register file 408. Thus, two words of data are written into the rename register file 410 in a single cycle. However, it will be noted that only one word of the data comes from cache 404.

To allow two words of data from the cache to be written to rename register file 214, the LSU 206 and 208 shown in FIG. 2 are cascaded together and provided with connecting logic as shown in FIG. 5. FIG. 5 shows the effective address lines coming out of each of LSU 206 and 208 and into cache 214, respectively. It will be noted that cache 214 in this embodiment is provided with two input ports and two output ports so that it is capable of writing two words into two distinct registers in register file 218. One output port of cache 214 forwards data to formatter 212 which loads the rename register file 218. The other output of cache 214 forwards data to formatter 212 before coupling to the rename register file 218. Four write ports W0–W3 are provided on register file 218 to receive data from the LSU's data cache, and from EA0 and EA1.

In this version of the invention, the dispatch unit "unrolls" the LMW type instructions to primitive operations which look like the LDU instruction, (LDU primitives). This allows the dispatch unit to use an existing mechanism to control the number of entries placed on the completion table (also referred to as the "reorder buffer"), in conjunction with the number of registers that are reserved in the rename register file. The load/store units "unroll" LMW type instructions to look like both "LDU primitives," for purposes of interfacing to the completion table unit at finish time, and "load primitives" for purposes of address generation and interfacing to the data cache unit. This is described in greater detail with respect to the specific load instruction below:

LDU R15, R1+D

In this instruction, the contents of register R15 will be loaded with the contents of the memory location addressed by (R1+D), and register R1 will be loaded with the effective address of R1+D.

At dispatch, the LDU instruction is placed on the reorder buffer as shown in FIG. 5B. In this case, it is assumed that the instruction is assigned an IID of 0. It will be noted that the main difference between this operation and a regular primitive load is that two writebacks are noted on the reorder buffer entry for the instruction.

Also during the dispatch cycle, two locations are reserved in the rename register file for the above LDU instruction so that, upon finishing, space is available in the rename register to store the data required by both writebacks of the LDU instruction. Both of the rename registers which are assigned by the rename register control logic to contain the data destined for the registers targeted by the LDU instruction are forwarded to the load/store units. This is shown in FIG. 5C. More specifically, in FIG. 5C, it is seen that register R15 is renamed to rename register Zero ("RR0") and register R1 is renamed to rename register one ("RR1"). Thus, entry zero of the rename register corresponds to architected register 15, and entry 1 of the rename register corresponds to architected register 1.

After the dispatch cycle, the addresses are generated for the instructions. This is referred to herein as the "AGEN" cycle. In the AGEN cycle, the effective address is generated by the adder contained in the load/store unit. The adder sums the contents of register R1 with D. This data is then latched into port W0 in rename register file 218 at the address RR1 along path RA0 shown in FIG. 5A. The effective address is then sent to cache 214 for data access.

After the AGEN cycle, the processor begins the cache access cycle. Assuming a data cache hit, data is forwarded from cache 214 to formatter 212, then to rename register file 218 to port W1 along path RT0 at address RR0. Finally, at the finish cycle, once the data has been properly written into rename register file 218, the instruction is ready to finish. The instruction ID tag, (IID=0), is forwarded from the LSU control logic to the reorder buffer, along with any exception information. Assuming there is no exception information, then the reorder table is updated as shown in FIG. 5D. Specifically, a finished bit is asserted in the entry for IID 0 in the reorder table, and no exception bits are asserted which would require the processor to perform some exception handling routine depending on the nature of the exception.

At the completion cycle, when all other previous operations in the reorder table have completed without exception, the LDU instruction IID=0 may then be completed. At completion, the reorder buffer first checks for exceptions in the entry associated with IID 0. If there are no exceptions, then the reorder buffer sends a signal to control logic for the rename register files which instructs the rename register files to forward the next two locations, i.e., RR0 and RR1, to the GPR register file. In the following cycle (the write back cycle) the rename register file 218 receives a signal from the reorder buffer to write the next two sequential locations. In this case, the data at RR0 is physically written to GPR location R15 and the data at RR1 is physically written to GPR location R1. Thus, the state of the processor is permanently changed.

With the above in mind, the operation of one embodiment of the invention will be described in still further greater detail with respect to the following load multiple operation:

LMW RT RA+D where the architectural registers will be loaded with data beginning at memory location RA+D and starting at target register RT through the end of the architectural register file. Assuming that RT is 27, the load multiple instruction will be unrolled into multiple LDU instructions. For example, the first instruction is denoted as:

LMW R27, R1+D

Thus, the registers R27 through R3 will be updated as follows:

R27<- - - memory location (R1+D)
R28<- - - memory location (R1+D+4)
R29<- - - memory location (R1+D+8)
R30<- - - memory location (R1+D+12)
R31<- - - memory location (R1+D+16)

Figures 7, 8A, 8B, 8C:
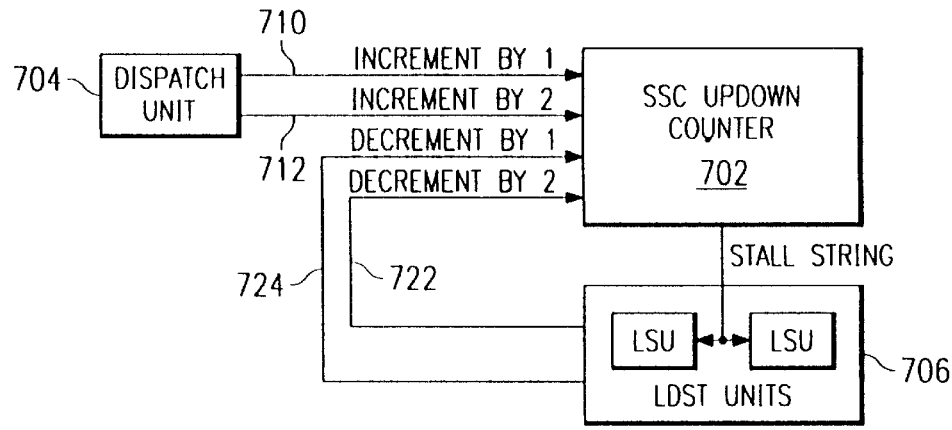
FIG. 7 is a block diagram of a string stall counter according to an embodiment of the invention.
FIGS. 8A–8C depict the operation of the reorder buffer and rename register file according to a further embodiment of the invention.

In the dispatch cycle, in a first cycle, the dispatch unit recognizes the load multiple operation. The load multiple operation is placed on the reorder buffer and it is marked as a "pseudo" op. One location is reserved in the rename register file. The rename register assigned for the architectural register (also referred to as the "rename tag") is forwarded to the load/store units along with the load multiple op code. A register rename count (RRC) is sent to the load/store unit string stall counter (SSC). In this case, a count of one for the LDU instruction is sent to the SSC since only one register is renamed. FIG. 7 is a block diagram illustrating the string stall counter according to an embodiment of the invention. This will be described in greater detail herein.

On the second cycle, the dispatch unit decodes the load multiple instruction into a load with update primitive instruction as follows:

RDU R28, R29+D

It will be understood that the above instruction is not technically a "load with update" instruction as would be issued from the instruction queue. Rather, it is a primitive instruction as discussed above and is generated by the dispatch unit as a part of the "unrolling" of the load multiple instruction. The reorder buffer assigned IID=1 to the above pseudo op. The writeback field in the reorder entry is set to 2 since two locations (RR1 and RR2) are reserved in the rename register file. In RRC of 2 is sent to the SSC.

On the third cycle, the dispatch unit further unrolls the load multiple instruction to generate the load with update primitive instruction as follows:

LDU R30, R31+D

The reorder buffer assigns IID equal 2 to this pseudo op. The writeback is set to 2 in the reorder buffer since two locations (RR3 and RR4) are reserved in the rename register file. Again, an RRC of 2 is sent to the SSC. The dispatch unit then detects that this is the end of the load multiple operation. Thus, the reorder buffer now appears as shown in FIG. 5E. Additionally, the rename register file appears as shown in FIG. 5F.

Referring now to FIG. 7, the string stall counter ("SSC") will be described in greater detail. The SSC, in one embodiment, is a conventional up/down counter 702. The dispatch unit 704 signals the SSC 702 to increment by one, or increment by two, depending on whether line 710 or 712 is asserted, respectively. The load/store units also signal SSC 702. The load/store unit 706 either cause SSC 702 to decrement by one, or decrement by two, depending on whether line 724 or 722 is asserted. Additionally, the SSC 702 can signal the load/store unit 706 to stall the string.

Dispatch unit 704 signals the SSC 702 how many renames are assigned, either one or two, in this embodiment of the invention, along path 710, 712. The load/store units signal the SSC 702 how many renames are associated with each effective address, along path 722, 724.

If the counter is zero in the SSC, the SSC stalls the load/store unit 706. If the count is one, then one load/store unit may proceed with its operation. If the count is two or greater, then both load/store units may continue operation. This counter keeps the load/store units from sending finished reports or data for instructions which have not been dispatched yet.

After dispatch, the AGEN cycle begins for the load multiple instruction. The scheduler logic in the load/store unit recognizes that the current instruction is a load multiple instruction. Accordingly, both load/store units are allowed to finish any pending operations. The scheduler logic (not shown) then issues the load multiple operation to LSU 208, as shown in FIG. 2. Of course, LSU 206 could also be used as a matter of design choice. LSU 208 and 206 will be described in somewhat greater detail with respect to FIG. 6.

FIG. 6 is a schematic diagram illustrating a portion of the logic for a load/store unit according to an embodiment of the invention for generating the effective addresses for the primitive load instructions. In this case, the first load/store unit includes an adder 501 which generates the effective address EA0. Data for adder 501 is provided from latches A0 503 and B0 505. In turn, data is provided to latches A0 and B0 from multiplexors A0 507 and A0 509. The inputs to these multiplexors is provided by the RA and RB operands of the LDU instruction. Multiplexor 507 also has constant value inputs +4 and +8 which allow the effective address to be incremented by the appropriate number of bytes on each cycle. Control logic 511 is provided to operate multiplexors 507 and 509.

Similarly, a second load/store unit is provided with adder 502 which is fed by data from latches B0 and B1 (latches 504, 506). Data is multiplexed into latches B0 and B1 from multiplexors 508 and 510. Operands RA1 and RB1 provided data to the multiplexors 508 and 510, and multiplexor 508 is also provided with a constant value +8 input signal to increment the effective address. Control logic 512 is provided to control multiplexors 508 and 510. The output of adder 502 is effective address EA1. The R1 operand from the LDU primitive instruction is latched into latch A0 503 through multiplexor 507 controlled by control unit 511. The D operand is latched in latch B0 505 through multiplexor 509 which is also controlled by control logic 511.

In the first cycle of the AGEN, the effective address 0 (EA0) is generated by adder 501, which adds R1+D. EA0 is sent to cache 214 for data access. The target rename tag RR0 is sent along with the EA0 to the mis-queue for cache 214. In this embodiment of the invention, it will be understood that all cache accesses pass through the mis-queue buffer (not shown). The IID of 0 is sent along with EA0 to the cache 214 mis-queue. EA0 is also latched in latch B0 505 through multiplexor 509 which is operated by control unit 511. The constant +4 is latched in A0 503 through multiplexor 507 which is controlled by control unit 511.

Simultaneously, EA0 is also passed to the second load/ store unit and is latched in latch B1 506 through multiplexor 510. Multiplexor 510 is operated by control unit 512. The constant +8 is latched in latch B0 504 through multiplexor 508. Afterwards, the SSC is sent a signal to decrement by one. At the same time, a multiple finish bit ("M_fin") is sent along with the last occurrence of an IID as shown in FIG. 5G.

In a second cycle of AGEN, EA0 is generated by adder 501 which adds the contents of latch A0 503 and latch B0 505. The EA0 is sent to the cache 214 for data access. Simultaneously, EA0 is latched in latch B0 505 and the constant +8 is latched in A0 503.

In the same cycle, EA1 is generated by adder 502 which adds the contents of latch A1 504 and B1 506. EA1 is sent to cache 214 for data access. The target rename tag 1 (RR0+1) is sent along with EA0 to cache 214 mis-queue. EA1 is also latched in latch B1 506 and the constant +8 is latched in latch A1 504.

A data flow similar to the effective address data flow allows calculation of the IID tag and rename assignment such that an IID and rename tag is sent to the data unit control as shown in FIG. 5G. This time the SSC is sent a decrement signal of 2. The third cycle is similar to the second cycle. Thus, at the end of the cycles, the effective addresses, rename tags IID and M_fin are as shown in FIG. 5G.

In the cache access cycle, the cache forwards the data indexed by the address specified in table 5H. The data cache unit must insure that the data shown in FIG. 5H is returned in order. After the data is sent from the cache in the cache access cycle, the processor begins the finish cycle for the instructions. In other words, once data has been properly written into rename 218, a finish may occur. IID's marked with a M_fin tag may be finished. Afterwards, the reorder table is updated. The reorder table, according to this example, is shown in FIG. 5I. In the completion cycle, when all other previous operations in the reorder table have been completed, IID 0 may then be completed. The reorder buffer checks for exceptions in entry 0 and if there are none, it tells the rename to forward the next one location to the GPR register file. In subsequent cycles, the IID 1 can complete with writeback factor of 2, and so on.

Finally, in the writeback cycle, the rename 218 gets its signal from the reorder buffer to write the next one sequential location for IID 0. In subsequent cycles, when IID 1 completes, two GPRs are written and so on until the load multiple instruction is completed.

Of course, it will be recognized that the above example presumes that the data in the data cache is aligned on the cache boundaries. The problems associated with misaligned cache accesses are solved according to still a further embodiment of the invention. Referring now to FIG. 6A, there is shown the logical contents of a data cache 600 having misaligned words A, B, C and D. As shown, misaligned word A consists of four bytes a0–a3. Similar notation is used for words B, C and D. Lower case "x" denotes "don't care" data To fetch word A for loading into a rename register, two accesses to cache 600 are required. A pair of primitive load instructions that share the same IID performs the accesses. This allows only a single instruction entry to be retired by the completion table after the entire word is written to the appropriate rename register. Thus, in conventional processors, the first cache access to cache line 602 would return bytes x, x, a0 and a1. These bytes would be rotated in the formatter and stored in a merge latch. In the following cycle, the second cache access to cache line 604 would return bytes a2, a3, b0 and b1. These bytes would also be rotated and then re-assembled with the data stored in the merge latch to form the word consisting of a0, a1, a2 and a3, in that order. The reassembled word would then be forwarded to the targeted rename register. To fetch word B, cache lines 604 and 606 would be accessed and reassembled in a similar fashion. However, it is clear that eight clock cycles will be required to obtain all four words. The present invention addresses this shortcoming by using the merge latch to store data between accesses for different words. More specifically, logic is provided in the LSU 206 such that when the LSU recognizes the data for a complex load instruction is misaligned, it signals the formatter to retain and merge data in the merge latch for subsequent, sequential instructions, despite the fact that the instructions have different IIDs. Accordingly, retrieval of word A would be substantially the same as described above. But after word A is reassembled, the data in the merge latch, which includes bytes b0 and b1 is not discarded. Instead, cache line 604 is read and the formatter is instructed to assemble the data store in the merge latch during the processing of the previous instruction to be merged with the data from the current instruction. This avoids the necessity of re-accessing cache line 604. It is clear that, rather than required 2n cache accesses for misaligned data, where n is the number of rename registers to be loaded, the present invention provides a method of loading the same number of registers using only n+1 accesses. This aspect of the invention is further illustrated in FIG. 6B. In cycle 0, two LDU primitive instructions are issued, each of which target register RT and each of which is assigned IID=0. This instruction is also appended with status bits that indicate to the formatter whether the instruction is the first or second access to the cache. However, only one entry is created in the completion table for the pair of instructions. The formatter is provided with logic which generates the finished signal to the completion table for the instruction IID=0, only when the second access has occurred, and the reassembled data is written into the rename registers. The data remaining in the merge latch from instruction IID=0, is merged with the data from instruction IID 1 and forwarded to the rename register RT+1. Similar operations are performed for IIDs 1 through 2.

According to still a further embodiment of the invention, the store queue 216 is used to provide improved processor when executing complex store instructions. Specifically, store multiple, or store string instructions are unrolled into primitive store instructions. The unrolling of the store instructions is substantially similar to the unrolling of load instructions and need not be described again in detail for understanding the present invention. In conventional processors, as each of the primitive store instructions completes, the processor must move data from the GPR register file 224 into the data cache 214. This can result in a bottleneck of primitive store instructions waiting to complete because multiple accesses to the GPR file must often be arbitrated among several conflicting requests.

This problem is solved according to one embodiment of the invention by writing data for the primitive store instructions into the store queue 216 as each instruction finishes. The instruction is then marked as finished in the completion table 220. When the instruction is to complete in the completion table 220, the data is simply transferred from the store queue 216 to the data cache 214, without the necessity of reading from the GPR file 224. This provides the processor with the ability to complete multiple store instructions in a single cycle. This is because data from the GRP 224 or rename 218 can be transferred to the store queue 216 and be written to the store queue at or before finish time, and data from the store queue 216 can be transferred to the data cache 214 in subsequent cycles following a completion cycle for a given instruction.

According to another embodiment of the invention, a similar process is performed with respect to store multiple instructions as was described with respect to load multiple instructions above. To illustrate, it will be assumed that the processor executes the following store instruction:

STWD RS RA+D,

In this case, the store stores the contents of the register RS into the memory location at RA+D. This is designated by the notation:

Memory location (RA+D)<- - - (RS)

Assuming the specific instruction of:

STWD R15, R1+RD, then memory location (R1+D) will be loaded with the contents of GPR register R15.

At the dispatch cycle, the store word instruction is placed on the reorder buffer. This is shown in FIG. 8A. It will be noted that the main difference between this store operation entry and a regular load entry is that no writebacks are noted on the reorder buffer.

Also in the dispatch cycle, the RS location is looked up, i.e., R15, as shown in FIG. 8B. If it is found to have been reserved in rename, then a tag address and valid__in__ rename signal is forwarded to the load/store units. If it is not reserved in the rename, then it is in the GPR register file and a rename tag address is not needed. In this particular example, it will be assumed that R15 is found to be assigned to rename target register 0.

In the AGEN cycle, the load/store units generate the effective address by summing (R1+D). This effective address is sent to the memory management unit (MMU) for translation for the effective address. After the AGEN cycle, the store op and control bits are sent to the store queue 216. Once in the store queue 216, control logic continually requests the store data either from the rename register file, if the valid__in__rename bit is on from the rename tag passed with the store, or if the valid__in__rename is not on, the data is fetched from the GPR register file.

At the finish cycle, once the data has been received in the store queue, a finish signal is sent. IID 0 is sent to the reorder buffer along with any exception information. The reorder table is then updated and will appear as shown in FIG. 8C.

At the completion cycle, when all other previous instructions in the reorder table have completed, IID 0 may then be completed. The reorder buffer checks for exceptions in entry 0. If there are none, it signals the store queue to write to the cache.

Applying the above embodiment to a store multiple operation, for example: STMW RS, RA+D, it will be noted that memory location RA+D is assigned RS and memory location (RA+D+4) is assigned RS+1, and so forth. The unrolling of the instruction is similar to the load multiple instruction except that the registers are not reserved in the rename, rather they are looked up as the operation of instruction progresses. Otherwise, the operation is simultaneously unrolled in the LSUs in the same manner as described with respect to load multiple operations.

However, the load/store units must be informed what the assigned RS renamed tag is, and also if it is marked valid by the signal valid_in_rename. This is accomplished by placing each of the STM pseudo ops into the instruction buffers above the LSUs. Of course, the valid_in_rename bit and rename assign tag is placed in this queue as well.

As the LSU unrolls the instruction, it checks for available pseudo ops in the instruction queue and obtains the rename tag and control information for the instruction. Once it has obtained the control information, the pseudo op in the instruction queue is no longer needed. If the pseudo op has not been dispatched into the instruction queue yet, the LSUs must wait, therefore, achieving the same function as the counter did in the LMW unrolling.

Although the present invention has been described with respect to the specific embodiments above, it will be appreciated by those of skill in the art that variations in form and detail may be made without departure from the scope and spirit of the present invention. For example, the invention may easily be expanded to include multiple GPR's, allow the dispatching of additional LDU primitive operations, and the data flow paths for the load/store units and the data cache may be expanded.

What is claimed is:

1. A method for processing cache access instructions in a superscalar processor, the processor having an instruction cache, a sequencing unit, at least one load/store unit, a data cache, an architectural register file, a rename register file, and a completion unit, the method comprising the steps of:
   (a) forwarding a cache accessing instruction from the instruction cache to the sequencing unit;
   (b) forwarding the cache accessing instruction to a first load/store unit;
   (c) generating a plurality of primitive instructions in the sequencing unit, the plurality of primitive instructions together directing a result identical to the result directed by the cache accessing instruction; and
   (d) generating the plurality of primitive instructions in the first load/store unit in parallel with the generation of the plurality of instructions generated in the sequencing unit.

2. The method of claim 1 wherein the cache accessing instruction comprises a load multiple instruction.

3. The method of claim 2 wherein the plurality of primitive instructions comprise a plurality of load instructions, each respective load instruction adapted to forward data from the data cache to a particular rename register which is associated with the respective load instruction.

4. The method of claim 1 further comprising the step of assigning an instruction ID to at least one of the primitive instructions.

5. The method of claim 1 further comprising the step of creating an entry in the completion unit for each of the primitive instructions.

6. The method of claim 1 wherein the step of generating the plurality of primitive instructions in the sequencing unit and the step of generating the plurality of primitive instructions in the first load/store unit each includes generating at least one load instruction adapted to forward data from the data cache to multiple rename registers.

7. The method of claim 1 wherein two different primitive instructions from the plurality of primitive instructions are executed in the same cycle.

8. The method of claim 7 wherein one of the two different primitive instructions is processed by the first load/store unit and the other of the two different primitive instructions is processed by a second load/store unit.

9. The method of claim 1 wherein the processor includes a second load/store unit, and further comprising the steps of:
   (a) stalling one of the first and second load/store units when a rename register file location has not been assigned for a primitive instruction being processed by one of the first and second load/store units.

10. The method of claim 9 further comprising the steps of:
    (a) incrementing a counter once for each rename register file location assigned in response to one of the primitive instructions; and
    (b) decrementing the counter once for each rename register file location associated with a particular primitive instruction processed by one of the first and second load/store units, the count present on the counter indicating whether one of the load/store units is to be stalled.

11. A circuit for processing cache access instructions in a superscalar processor, the processor having an instruction cache, a sequencing unit, at least one load/store unit, a data cache, an architectural register file, a rename register file, and a completion unit, the circuit comprising:
    (a) means for forwarding a cache accessing instruction from the instruction cache to the sequencing unit;
    (b) means for forwarding the cache accessing instruction to a first load/store unit;
    (c) means for generating a plurality of primitive instructions in the sequencing unit, the plurality of primitive instructions together directing a result identical to the result directed by the cache accessing instruction; and
    (d) means for generating the plurality of primitive instructions in the first load/store unit in parallel with the generation of the plurality of instructions generated in the sequencing unit.

12. The circuit of claim 11 wherein the cache accessing instruction comprises a load multiple instruction.

13. The circuit of claim 12 wherein the plurality of primitive instructions comprise a plurality of load instructions, each respective load instruction adapted to forward data from the data cache to a single rename register associated with the respective load instruction.

14. The circuit of claim 11 further comprising instruction ID assignment means for assigning an instruction ID to least one of the primitive instructions.

15. The circuit of claim 11 further comprising means for creating an entry in the completion unit for each of the primitive instructions.

16. The circuit of claim 11 wherein the means for generating the plurality of primitive instructions in the sequencer and the means for generating the plurality of primitive instructions in the first load/store unit each include means for generating at least one load instruction adapted to forward data from the data cache to multiple rename registers.

17. The circuit of claim 11 wherein two different primitive instructions from the plurality of primitive instructions are executed in the same cycle.

18. The circuit of claim 17 wherein one of the two different primitive instructions is processed by the first load/store unit and the other of the two different primitive instructions is processed by a second load/store unit.

19. The circuit of claim 11 wherein the processor includes a second load/store unit and further comprising:

(a) means for stalling one of the first and second load/store units when a rename register file location has not been assigned for a primitive instruction being processed by said one of the first and second load/store units.

20. The circuit of claim 19 further comprising:

(a) means for incrementing a counter once for each rename register file location assigned in response to one of the primitive instructions; and (b) means for decrementing the counter once for each rename register file location associated with a particular primitive instruction processed by one of the first and second load/store units, the count present on the counter indicating whether one of the load/store units is to be stalled.

* * * * *

UNITED STATES PATENT AND TRADEMARK OFFICE
CERTIFICATE OF CORRECTION

PATENT NO. : 6,035,394
DATED : March 7, 2000
INVENTOR(S) : David Scott Ray, et al It is certified that error appears in the above-identified patent and that said Letters Patent is hereby corrected as shown below:

In column 11, line 3 of the Patent, "RDU" should be changed to --LDU--.

Signed and Sealed this

Twentieth Day of February, 2001

*Attest:*

NICHOLAS P. GODICI

*Attesting Officer*     *Acting Director of the United States Patent and Trademark Office*